No. 829,716. PATENTED AUG. 28, 1906.
A. W. JOHNSON.
REGISTERING BANK.
APPLICATION FILED NOV. 18, 1905.
3 SHEETS—SHEET 1.
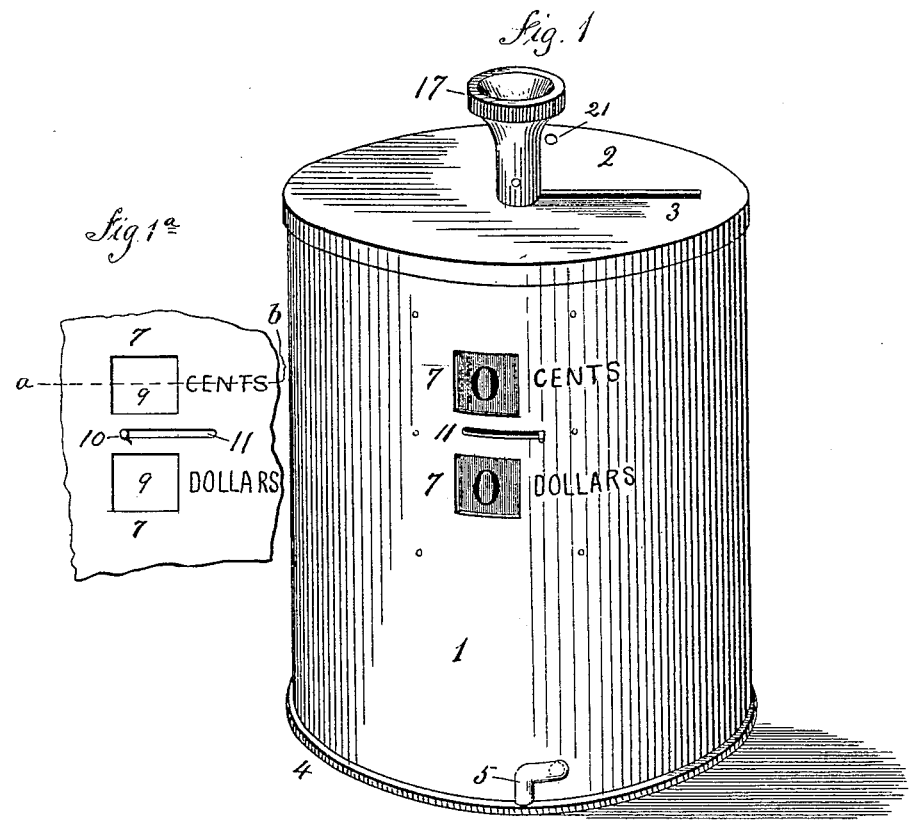
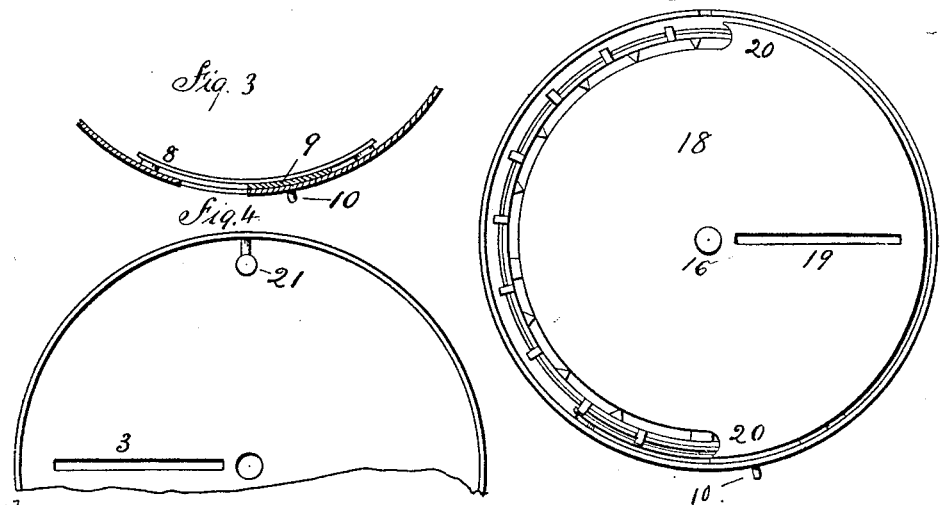
Witnesses
Ida F. Waters
Ethel M. Fellows
Inventor
Albert W. Johnson No. 829,716. PATENTED AUG. 28, 1906.
A. W. JOHNSON.
REGISTERING BANK.
APPLICATION FILED NOV. 18, 1905.
3 SHEETS—SHEET 2.
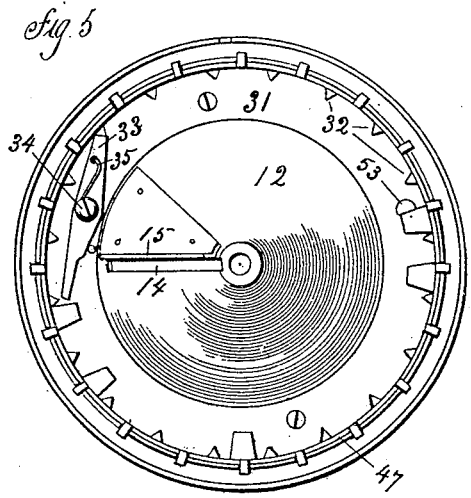
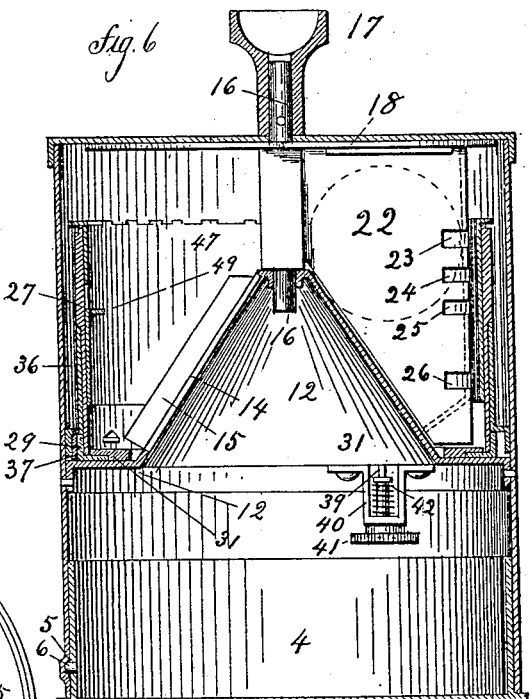
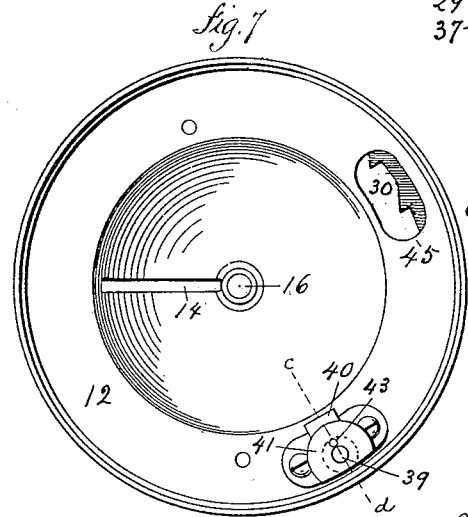
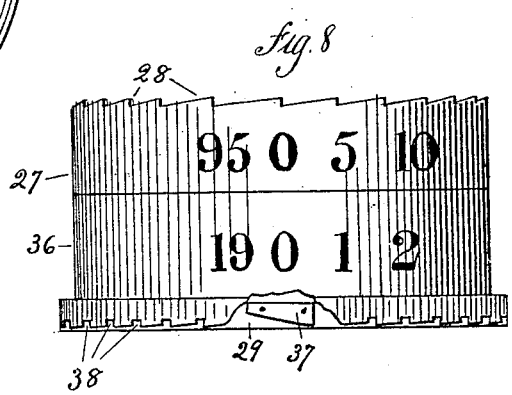
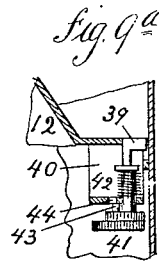
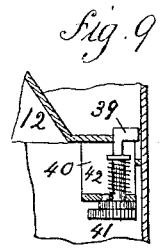
Witnesses
Ida F. Waters
Ethel M. Fellows
Inventor
Albert W. Johnson No. 829,716. PATENTED AUG. 28, 1906.
A. W. JOHNSON.
REGISTERING BANK.
APPLICATION FILED NOV. 18, 1905.
3 SHEETS—SHEET 3.
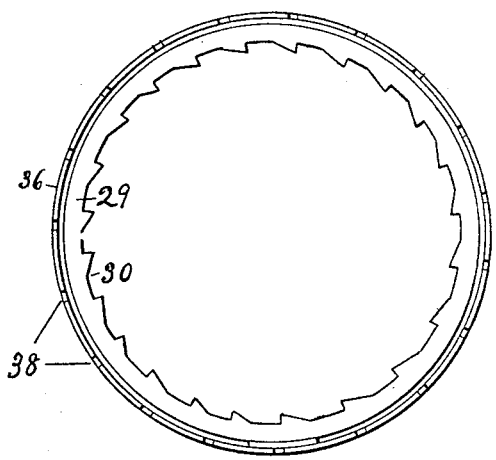
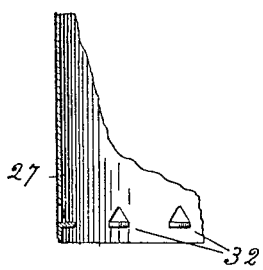
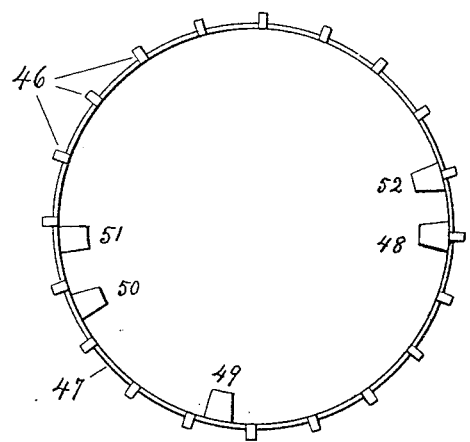
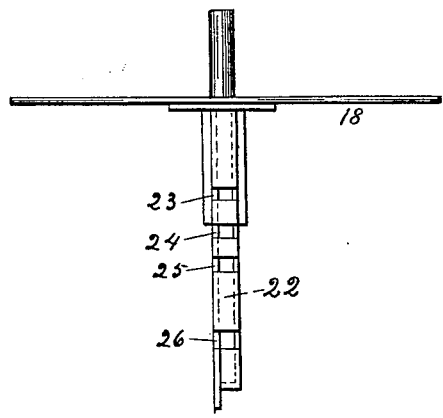
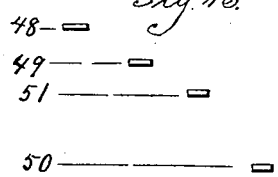
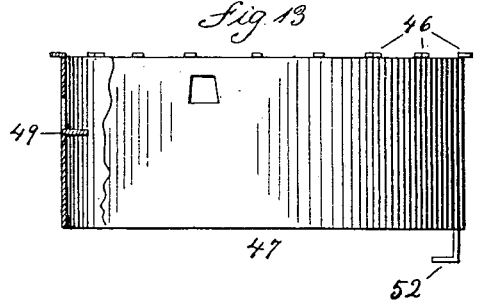
Witnesses.
Ida F. Waters.
Ethel M. Fellows.
Inventor
Albert W. Johnson

UNITED STATES PATENT OFFICE.

ALBERT W. JOHNSON, OF NEW HAVEN, CONNECTICUT.

REGISTERING-BANK.

No. 829,716.  Specification of Letters Patent.  Patented Aug. 28, 1906.

Application filed November 18, 1905. Serial No. 288,023.

*To all whom it may concern:*

Be it known that I, ALBERT W. JOHNSON, a citizen of the United States, residing at New Haven, in the county of New Haven and State of Connecticut, have invented a new and useful Registering-Bank, of which the following is a specification.

My invention relates to improvements in banks which register the amounts of coin deposited therein; and the object of my improvements is to produce a bank accurate in its registering, of simple and durable construction, and inexpensive to manufacture. These objects I attain by the mechanism illustrated in the accompanying drawings, in which—

Figure 1 is a perspective view of the bank complete. Fig. 1ª is a portion of the front, showing the windows closed by the screen.
Fig. 2 is a plan with the top of the case and knob removed. Fig. 3 is a cross-section of Fig. 1ª on the broken line $a\ b$, but showing the windows open. Fig. 4 is a portion of the under side of the top of the case. Fig. 5 is a plan with the top of case and internal mechanism removed down to the base-plate and parts wholly supported by it. Fig. 6 is in part a central vertical section of the bank complete. Fig. 7 is a plan view of the bank inverted and the bottom of the case removed. Fig. 8 is an elevation of the registering-cylinder with its indicating-band, showing cam. Figs. 9 and 9ª are vertical sections of a part of the case and base-plate, showing the detent-bolt in two positions. Fig. 10 is a plan view of parts shown in Fig. 8 inverted. Fig. 11 is a vertical section of a part of registering-cylinder, showing V-shaped lugs. Fig. 12 is a plan of pawl-cylinder. Fig. 13 is an elevation of the same. Fig. 14 is a front elevation of the operating-shaft, coin-guide, and disk mounted thereon. Fig. 15 is a diagram showing the comparative positions vertically of the inwardly-projecting lugs of the pawl-cylinder shown in Fig. 12.

Similar numerals refer to similar parts throughout the several views.

The outer case 1 is a vertical cylinder with a flat top 2, with a radial coin-slot 3 therein, and a cup-shaped bottom 4, arranged to slide up into the cylinder, to which it is secured by the well-known bayonet-lock, in which the slot or groove 5 in the cylinder is engaged by the lug 6 on the cup.
Window-openings 7 7 through the side of the case are for the purpose of reading the indicating-figures of the registering mechanism. A screen 9 is arranged to slide laterally on a bar 8, which crosses the line of the window-openings, is secured to the case on either side, is readily adjusted to a position covering the window-openings or to one side by means of a stud 10, extending out through a slot 11 in the case.

The case is divided laterally into two compartments by a base-plate 12, which is secured to the wall of the case and supports the mechanism above, the space below being principally occupied by the cup-shaped bottom for holding the coin deposited in the bank. This base-plate is flat for a space adjacent to the case, while its central portion is conical, rising upward at an angle of about fifty-five degrees. In this conical portion of the base-plate is a radial slot 14, through which the coins are discharged from the operating mechanism. Adjacent to this slot and parallel therewith is a rib 15, secured to the base-plate and projecting upward.

A vertical operating-shaft 16, journaled in the apex of the conical base-plate, extends upward through the center of the top of the case and is provided on its outer end with a knob or handle 17. Attached to this shaft is a horizontal disk 18, close to and covering nearly all of the under surface of the top of the case. A radial slot 19, similar to the coin-slot in the top of the case, extends through this disk. A portion of this disk around its circumference on one side is cut away, leaving the shoulders 20 20 to strike against a stop-stud 21, projecting downward from the top of the case, to limit the movement on its axis of the operating-shaft in either direction. Depending from the disk 18 and firmly secured to it, and also to the operating-shaft, is a coin-guide 22, composed of two vertical plates joined at their outer and inner edges, but open at the top and bottom, leaving a space between the plates of suitable dimensions for the largest coin the bank is designed to receive to pass freely through and in perfect alinement with the radial slot through the disk. This coin-guide is provided at its outer edge with short transverse slots 23 24 25 26, extending inward through both its sides and outer edge. The bottom of the guide is on an angle to correspond with the angle of the conical base-plate and a little above it.

A vertical registering-cylinder 27, concentric with the operating-shaft and outer casing, is provided with ratchet-teeth 28 at its top and with a flange-ring 29, a cross-section of which would be L-shaped, secured to it at its bottom. The upright part of this ring extends upward on the outer surface of the cylinder, while the horizontal part extends inward and is provided with notches 30 at its inner edge. This cylinder, with its flange-ring, rests upon the base-plate and is retained in position by a circular cap 31, formed with a shoulder on its under side. This cap extends over the notched edge of the flange-ring, which has a bearing against its shoulder and is loosely fitted to allow the cylinder to turn freely on its axis. A line of V-shaped teeth 32 extends around the inner surface of this cylinder a little above the cap 31, pointing inward and spaced an equal distance apart.

A double-ended pawl 33, pivoted on a stud 34 and operated by a spring 35, is mounted on the cap 31 and is arranged to engage with the V-shaped teeth 32 on the registering-cylinder to prevent it from being turned backward, while its opposite end is adapted to be forced against the action of its spring outward into engagement with the same teeth by the coin-guide as it approaches the coin-discharge slot 14 in the base-plate for the purpose of preventing the registering-cylinder from being carried by its momentum past the point where it should stop.

Fitted loosely upon and surrounding the registering-cylinder is a cylindrical indicating-band 36, which rests upon the upturned edge of the flange-ring 29, at which point it has an offset and extends outward in a horizontal direction for a short distance and then downward again in a vertical direction nearly but not quite to the surface of the base-plate, leaving an annular space between it and the upturned portion of the flange-ring, to which is fixed a cam 37, adapted to move through this annular space. Above the upper edge of this indicating-band is a shoulder on the registering-cylinder, (shown in Fig. 6,) between which and the flange-ring the indicating-band is adapted to turn freely.

A vertical detent-bolt 39 passes through a yoke 40, secured to the under side of the base-plate, and up through the base-plate. Its lower end is threaded, and a nut 41 is mounted thereon. A small stud 43 projects upward from this nut, arranged to enter and move freely in a hole 44 in the yoke. This detent-bolt is adapted to move freely through the yoke and base-plate and to engage at its upper end in notches 38 in the lower edge of the indicating-band 36, this end being attained by means of a spring 42, compressed between the yoke and a shoulder on the detent-bolt, which forces it upward against the edge of the indicating-band and into the notches as they are presented to it.

Fitted loosely within the registering-cylinder and depending from its top by short outwardly-extending radial arms is a vertical pawl-cylinder 47, provided with inwardly-extending lugs 48 49 50 51, arranged at varying heights, so that each stands in the path, respectively, of one of the slots 23 24 25 26 in the edge of the coin-guide and passes through it when the coin-guide is turned forward or backward. The supporting radial arms are arranged to ride over the ratchet-teeth at the top of the registering-cylinder when the pawl-cylinder is turned backward and to engage with the faces of the teeth when turned in the opposite direction, and thereby turn the registering-cylinder with it. For the purpose of limiting the backward movement of the pawl-cylinder, and with it the coin-guide, a bar 52 is secured in a vertical position to the inner wall of the pawl-cylinder. Its upper and lower ends, turned inwardly, are so arranged that its upper end comes in contact with the coin-guide, while its lower end strikes against a stop-stud 53, projecting upward from the cap 31.

An elongated opening 45 through the base-plate, directly under the notches 30 in the flange-ring on one side, renders these notches accessible from the lower side of the base-plate.

This bank is designed to receive only nickels, dimes, quarters, and half-dollars.

The outer surfaces of the registering-cylinder and indicating-band are each divided into twenty equal circumferential spaces. Upon these spaces on the registering-cylinder are a series of recording-numbers divisible by five up to ninety-five, inclusive, and on one of these spaces a cipher (0.) These figures are arranged to pass before the upper window in the case when the cylinder is turned and indicate in cents the fractional parts of a dollar.

Upon the spaces on the indicating-band are a series of consecutive indicating-numbers from "1" to "19," inclusive, with one space bearing a cipher. These figures are arranged to pass before the lower window in the case when the indicating-band is turned and indicate dollars.

To every complete revolution of the registering-cylinder the indicating-band moves forward one space.

The number of ratchet-teeth and of V-shaped teeth on the registering-cylinder, also the detent-notches in the edge of the indicating-band, correspond in number with these spaces and their indicating-numbers in each series, there being twenty of each.

The operation of my device is as follows: By means of the knob at the top the operating-shaft is turned backward (to the left) until the coin-guide comes to the upper end of the stop-bar 52 on the pawl-cylinder, with which it engages. Then continuing the same movement, the pawl-cylinder is turned backward with the coin-guide until the lower end of the stop-bar 52 comes in contact with the stop-stud 53, at which point the space in the coin-guide is in perfect alinement with the coin-slot in the top of the case, and the device is ready to receive a coin. If a half-dollar is dropped into the coin-slot, it falls into the coin-guide and, striking upon the conical base-plate, rolls to the outer limit of the space in the coin-guide. (Its position is represented by a dotted circle in Fig. 6.) The knob now being turned to the right, the coin-guide moves forward, the lower edge of the coin sliding on the cone-shaped base, the coin-operated parts of the device remaining stationary until lug 48 on the pawl-cylinder enters the slot 23 in the coin-guide and comes in contact with the half-dollar, which pushing the lug forward causes the pawl-cylinder to turn, and by reason of its engagement with the ratchet-teeth in the top of the registering-cylinder that also is carried forward, and this movement is continued until the coin-guide reaches and is stopped by the rib 15 on the base-plate, at which point the coin being directly over the discharge-slot 14 drops through into the lower part of the case; but just before reaching this point the lower end of the coin-guide encounters the front end of the double-ended pawl 33 and impinging against its inner surface forces it outward against the pressure of the pawl-spring and into position to engage with one of the V-shaped teeth on the registering-cylinder to prevent the cylinder from being carried too far by its momentum. At the first backward movement of the coin-guide it releases the pawl, which is instantly thrown by its spring into its normal position, in which it engages at its rear end with the V-shaped teeth to prevent the registering-cylinder from being turned backward by the friction of the pawl-cylinder arms riding over its ratchet-teeth. A continued backward movement of the knob now carries the parts back into the position to receive another coin, when the operation is repeated; but the registering-cylinder remains advanced ten spaces, or one-half of an entire revolution, that being the distance between the lug 48 and the discharge-slot. When a quarter-dollar is placed in the coin-guide, its diameter being enough less than that of the half it falls below the slot 23 in the coin-guide and passes under the lug 48 on the pawl-cylinder, which consequently is not moved forward until the coin comes to lug 49, which entering slot 24 in the coin-guide engages with it, and the pawl-cylinder and registering-cylinder are carried forward, as before, but only one-half the distance, or five spaces, as the lug 49 is located five spaces nearer the discharge-slot. When a dime is used, it passes under both lugs above mentioned and engages with lug 50, which is two spaces from the discharge-slot and which corresponds with slot 26 in the coin-guide. When a nickel is used, it passes under the two first-named lugs and over the last-named and engages with lug 51, which corresponds with slot 25 in the coin-guide and which is only one space from the discharge-slot. Should a cent be used, it would pass under lugs 48 49 51 and over 50, not engaging with either, and go through the discharge-slot without registering.

The cam 37 is so located on the flange-ring of the registering-cylinder with reference to the indicating-figures thereon that just as the indicating-number "95" approaches the window in the case the cam begins to depress the detent-bolt, and by the time this number is fully in front of the window the detent-bolt is completely free from its notch in the indicating-band and the band is free to move forward, carried by frictional contact with the registering-cylinder, upon which it is mounted. At the first forward movement of the registering-cylinder from this point the indicating-band is carried forward by it. The cam moves away from the detent-bolt, which by the action of its spring is again pressed against the edge of the indicating-band, and when the next notch therein comes to the detent-bolt it engages with it, thereby preventing the band from further movement.

It will be observed that the pawl-cylinder and coin-guide are always in the same position when a coin is deposited in the bank, as the coin-slot in the top is always closed by the disk 18, except when the coin-guide is at the extreme backward limit of its movement; but the coin-guide moves over a part of its course forward more or less, according to the value of the coin within, before it reaches the particular lug on the pawl-cylinder adapted to engage with a coin of that diameter and value. Therefore the pawl-cylinder, and with it the registering-cylinder, is carried forward only the exact distance required to indicate the value of the coin. It will be seen also that each of these lugs must be located on the pawl-cylinder with reference both to the diameter and value of the coin it is designed to engage with.

To set the registering mechanism to "0," draw the detent-bolt downward by means of the nut on its lower end until the stud on the nut is removed from its hole in the yoke. Then turn the nut slightly to one side and leave it with the stud resting on the yoke. Turn the registering-cylinder forward by means of the notches in the flange-ring seen through the opening in the base-plate until "19" appears at the lower window. Then release the detent-bolt again by turning the nut to its original position. Turn the registering-cylinder again and "0" will appear at each window.

The shoulders 20 20 on the disk and the stop-stud 21 projecting downward from the top of the case, are arranged to act in conjunction with the stop-stud on the cap and the rib on the base-plate to limit the movements of the coin-guide.

Obviously many changes might be made in the details of the mechanism herein described without departing from the scope and spirit of my invention.

What I claim as new, and desire to secure by Letters Patent, is—

1. In a registering-bank, the combination of a vertical operating-shaft carrying a vertical coin-guide, a stationary conical base-plate, a vertical registering-cylinder concentric with the operating-shaft and base-plate, and means for communicating the motion of the operating-shaft and coin-guide to the registering-cylinder, substantially as described.

2. In a registering-bank, the combination of a coin-operated registering-cylinder carrying an indicating-band concentric therewith mounted upon its outer surface, and means for arresting the movement of the indicating-band and allowing it to move only the distance from one of its indicating-numbers to the next while the registering-cylinder makes a complete revolution, substantially as described.

3. In a registering-bank, the combination of a vertical operating-shaft carrying a vertical coin-guide with slots in its outer edge, a vertical coin-operated pawl-cylinder with inwardly-extending lugs corresponding to said slots, and with outwardly-extending radial arms, and a vertical registering-cylinder, concentric with the pawl-cylinder and operating-shaft, provided with ratchet-teeth adapted to engage with said radial arms of the pawl-cylinder, substantially as described.

4. In a registering-bank, the combination of an operating-shaft, a base-plate supporting the shaft, a vertical registering-cylinder, a retaining-cap concentric therewith and with the operating-shaft, a double-ended pawl adapted to engage with teeth on the registering-cylinder as a stop to its movement both forward and backward, and means for communicating the movement of the operating-shaft to the registering-cylinder substantially as described.

5. In a registering-bank, a vertical registering-cylinder, an indicating-band concentric therewith mounted and adapted to turn freely thereon, a spring-operated detent-bolt adapted to engage with notches in the indicating-band, a cam carried by the registering-cylinder adapted to disengage the detent-bolt from the said notches, and means for holding the detent-bolt away from the indicating-band, in combination with an operating-shaft and means for communicating its movement to the registering-cylinder, substantially as described.

In testimony whereof I have signed my name to this specification in the presence of two subscribing witnesses.

ALBERT W. JOHNSON.

Witnesses:
 IDA F. WATERS,
 ETHEL M. FELLOWS.